(12) United States Patent
Bhattacharya et al.

(10) Patent No.: US 12,631,263 B2
(45) Date of Patent: May 19, 2026

(54) ACTUATOR WITH SHAPE MEMORY ALLOY ELEMENTS FOR OPERATING A VALVE

(71) Applicants: Johnson Controls Tyco IP Holdings LLP, Milwaukee, WI (US); INDIAN INSTITUTE OF TECHNOLOGY, KANPUR, Kanpur (IN)

(72) Inventors: Bishakh Bhattacharya, Kanpur (IN); Kapil Das Sahu, Pune (IN); Kanhaiya Lal Chaurasiya, Kanpur (IN); Ujjain Kumar Bidila, Hyderabad (IN); Mani Kumar P, Kanpur (IN)

(73) Assignees: Tyco Fire & Security GmbH, Neuhausen am Rheinfall (CH); Indian Institute of Technology, Kanpur, Kanpur (IN)

( * ) Notice: Subject to any disclaimer, the term of this patent is extended or adjusted under 35 U.S.C. 154(b) by 0 days.

(21) Appl. No.: 18/687,802

(22) PCT Filed: Aug. 29, 2022

(86) PCT No.: PCT/US2022/041899
§ 371 (c)(1),
(2) Date: Feb. 28, 2024

(87) PCT Pub. No.: WO2023/034215
PCT Pub. Date: Mar. 9, 2023

(65) Prior Publication Data
US 2024/0376994 A1     Nov. 14, 2024

(30) Foreign Application Priority Data
Aug. 30, 2021    (IN) .............................. 202111039151

(51) Int. Cl.
*F16K 31/02*        (2006.01)

(52) U.S. Cl.
CPC .................................. *F16K 31/025* (2013.01)

(58) Field of Classification Search
CPC ...... F16K 31/025; F16K 31/02; F16K 31/004; F16K 31/005
(Continued)

(56) References Cited

U.S. PATENT DOCUMENTS 3,140,852 A * 7/1964 Herzog .............. G05D 23/1921
                                                    237/8 R
3,613,732 A * 10/1971 Willson .............. F03G 7/06145
                                                    60/527
(Continued)

FOREIGN PATENT DOCUMENTS

EP         0 137 502 A2     4/1985

OTHER PUBLICATIONS

International Search Report and Written Opinion on PCT Appl. Ser. No. PCT/US2022/041899 dated Dec. 16, 2022 (19 pages).

*Primary Examiner* — Kenneth Rinehart
*Assistant Examiner* — Jonathan J Waddy
(74) *Attorney, Agent, or Firm* — Foley & Lardner LLP

(57) ABSTRACT

An assembly includes a frame configured to couple to a valve, an actuating arm movably coupled to the frame and configured to move a movable component of the valve to adjust a position of the movable component, and a biasing member coupled to the actuating arm and the frame. The biasing member is configured to bias the actuating arm in a first direction relative to the frame. The assembly further includes one or more shape memory alloy (SMA) elements coupled to the actuating arm and the frame. Responsive to an activation that causes the one or more SMA elements undergo a dimensional transformation, the one or more SMA elements are configured to operate against the biasing (Continued)

member to bias the actuating arm in a second direction opposite the first direction relative to the frame.

19 Claims, 6 Drawing Sheets

(58) Field of Classification Search
USPC .................................. 251/11, 129.01, 129.06
See application file for complete search history.

(56) References Cited

U.S. PATENT DOCUMENTS

| | | | | | |
|---|---|---|---|---|---|
| 3,625,002 | A | * | 12/1971 | Davis | .................... F16K 31/025 60/528 |
| 4,586,335 | A | * | 5/1986 | Hosoda | ................. B25J 9/1085 60/527 |
| 4,945,727 | A | | 8/1990 | Whitehead et al. | |
| 5,079,920 | A | * | 1/1992 | Whitehead | ......... F03G 7/06143 60/527 |
| 5,613,634 | A | | 3/1997 | Veronesi et al. | |
| 5,865,418 | A | * | 2/1999 | Nakayama | .......... G05D 23/026 60/528 |
| 6,142,443 | A | * | 11/2000 | Potschin | ............ F02M 63/0035 239/533.4 |
| 6,247,678 | B1 | * | 6/2001 | Hines | .................. F03G 7/06143 60/527 |
| 7,748,405 | B2 | * | 7/2010 | Ghorbal | ................. G05D 23/08 251/336 |
| 8,521,332 | B2 | | 8/2013 | Tiemann et al. | |
| 9,958,081 | B2 | | 5/2018 | Deperraz | |
| 2010/0108922 | A1 | * | 5/2010 | Foshansky | ............ F16K 31/002 251/129.01 |
| 2011/0315903 | A1 | * | 12/2011 | Sohn | .................. F03G 7/06145 251/11 |
| 2012/0104292 | A1 | * | 5/2012 | Kollar | .................. F16K 31/025 251/11 |
| 2012/0151913 | A1 | | 6/2012 | Foshansky | |
| 2020/0033034 | A1 | * | 1/2020 | Jeong | ................. B60H 1/00485 |
| 2022/0349490 | A1 | * | 11/2022 | Glazer | ................. F16K 25/005 |

* cited by examiner

ACTUATOR WITH SHAPE MEMORY ALLOY ELEMENTS FOR OPERATING A VALVE

CROSS-REFERENCE TO RELATED PATENT APPLICATIONS

The present application is a National Stage filing of International Patent Application No. PCT/US2022/041899, filed on Aug. 29, 2022, which claims the benefit of and priority to Indian Provisional Application No. 20/211, 1039151, filed on Aug. 30, 2021, the entire disclosure of which is hereby incorporated by reference herein.

BACKGROUND

The present disclosure relates generally to actuators. More specifically, the present disclosure relates to actuators for valves.

An actuator is used to operate a wide variety of devices, such as valves, in various systems. In some systems, one or more actuators may be coupled to a flow control component of a valve to selectively translate the flow control component between a number of positions. Depending on a position of the flow control component relative to a fluid passageway within the valve, an amount of fluid (e.g., gas, liquid, etc.) may flow through the passageway between one or more inlets and one or more outlets of the valve. Some designs of valve-operating actuators feature a rotary drive, which may be coupled to a motor configured to drive the actuator.

SUMMARY

At least one embodiment relates to an assembly. The assembly includes a frame configured to couple to a valve, an actuating arm movably coupled to the frame and configured to move a movable component of the valve to adjust a position of the movable component, and a biasing member coupled to the actuating arm and the frame. The biasing member is configured to bias the actuating arm in a first direction relative to the frame. The assembly further includes one or more shape memory alloy (SMA) elements coupled to the actuating arm and the frame. Responsive to an activation that causes the one or more SMA elements undergo a dimensional transformation, the one or more SMA elements are configured to operate against the biasing member to bias the actuating arm in a second direction opposite the first direction relative to the frame.

In at least one embodiment, a method of controlling a valve is provided. The method includes providing a frame configured to couple to a valve, providing an actuating arm movably coupled to the frame and configured to move a movable component of the valve to adjust a position of the movable component, and providing a biasing member coupled to the actuating arm and the frame. The biasing member is configured to bias the actuating arm in a first direction relative to the frame. The method further includes selectively activating one or more shape memory alloy (SMA) elements coupled to the actuating arm and the frame. Responsive to the activation the one or more SMA elements undergo a dimensional transformation, such that the one or more SMA elements operate against the biasing member to bias the actuating arm in a second direction opposite the first direction relative to the frame.

In at least one embodiment, a valve actuator assembly is provided. The assembly includes a frame, a valve coupled to the frame, an actuating arm configured to be movable relative to the frame and the valve, and a biasing member coupled to the actuating arm and the frame. The biasing member is configured to bias the actuating arm in a first direction relative to the frame. The assembly further includes one or more activatable elements coupled to the actuating arm and the frame. The one or more activatable elements, responsive to an activation, undergo a dimensional transformation to bias the actuating arm in a second direction opposite the first direction relative to the frame. The assembly further includes a movable component coupled to the actuating arm and positioned at least partially within the valve. The movable component is configured to control a variable amount of fluid flow through the valve based on a position of the actuating arm.

This summary is illustrative only and should not be regarded as limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
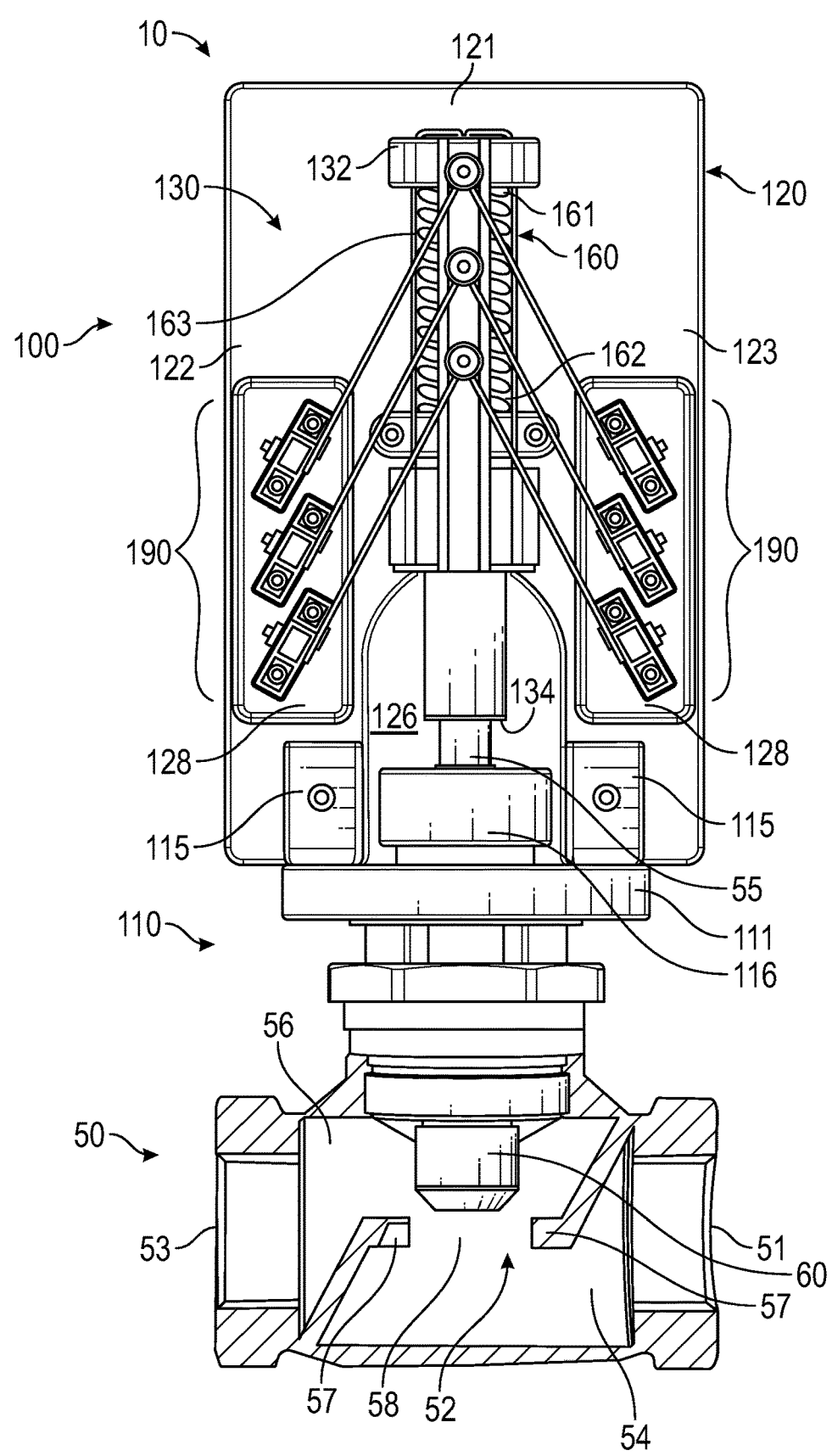
FIG. 1 is a front view of an actuator and a cross-sectional view of a valve, according to one embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to valve actuators, including, but not limited to, the control of a valve actuator using a number of activatable elements (e.g., energy-activatable elements, elements that undergo a dimensional transformation in response to a presence of an energy source, shape memory alloy (SMA) elements, etc.). A valve may include a passageway through which fluid may flow from an inlet to an outlet. The valve may further include a plug (e.g., a fluid control component, a movable component, etc.), which may be selectively translated or otherwise moved between a number of positions within the passageway in order to control an amount of the fluid that may flow through the passageway. A valve actuator may control the position of the plug. In some systems, the actuator may include a drive member (e.g., a motor) in order to facilitate (e.g., drive, power, etc.) movement of an arm (e.g., an actuating arm, a rod, elongate member, etc.) of the actuator. The arm, in turn, may be coupled to the plug, such that the actuator may translate the plug between a variety of positions in order to control the amount of fluid that may flow through the passageway. For example, the actuator may translate the plug to a position such that more fluid may flow through the passageway than when the plug was in a previous position (e.g., opening the valve, actuate the valve, etc.). Conversely, the actuator may translate the plug to a position such that less fluid may flow through the passageway than when the plug was in a previous position (e.g., closing the valve, de-actuate the valve, etc.).

In some systems, the drive member may be a rotary drive coupled to the arm of the actuator via a number of gears. A particular type of the one or more gears (e.g., size, tooth dimensions, etc.) may be determined based on a particular type of the actuator. As an example, in linear actuators, the rotary drive may be coupled to the arm via a rack and pinion gear arrangement to in order to convert the rotary motion of the drive into linear motion of the arm. As another example, in rotary actuators, the rotary drive may be coupled to the arm via an arrangement of spur gears, bevel gears, or a similar type of gear. However, such systems may be expensive and require frequent maintenance associated with multiple components such as gears and motors. Such systems may also experience issues such as the creation of noise due to friction between mating parts, such as gears.

Various embodiments disclosed herein relate to an actuator for a valve that may, eliminate or reduce the need of gears and motorized drive. In one embodiment, the actuator may include activatable elements (such as SMA elements) arranged for actuation and de-actuation of the valve. The actuator may include a spring-loaded actuating arm coupled to a plug or movable member of the valve such that when the arm is displaced, the displacement of the arm is transmitted to the plug resulting in opening or closing of the valve. The SMA elements may be obliquely coupled to the arm (e.g., angularly offset relative to a longitudinal axis) and be configured to contract (thus displacing the arm towards the valve and de-actuating the valve) in response to a presence of heat, or extend (thus displacing the arm away from the valve and actuating the valve) in response to a lack thereof. For example, SMA elements generally exist in two material phases, martensitic and austenitic. When SMA elements are heated (by a heating source, for instance) past a transformative temperature, the elements may be heated through a crystalline phase change known as thermoelastic martensitic transformation that results in a transition from the martensitic phase to the austenitic phase. In the martensitic phase, the SMA elements may expand and/or be easily deformed to a new shape or arrangement. In the austenitic phase, the SMA elements may contract and/or recover their previous shape. In general, this process is known as shape memory.

The actuator may further include at least one pair of holders configured to maintain a position of one end of a particular SMA element relative to another end of the particular SMA element. The at least one pair of holders may be coupled to a first surface of a frame of the actuator. In some embodiments, at least one pair of similarly configured holders may be coupled to a second surface opposite the first surface. Thus, in various embodiments, the actuator may include a symmetrical arrangement of such pairs of holders and associated SMA elements on one surface or on opposite surfaces of the actuator frame.

Figure 2:
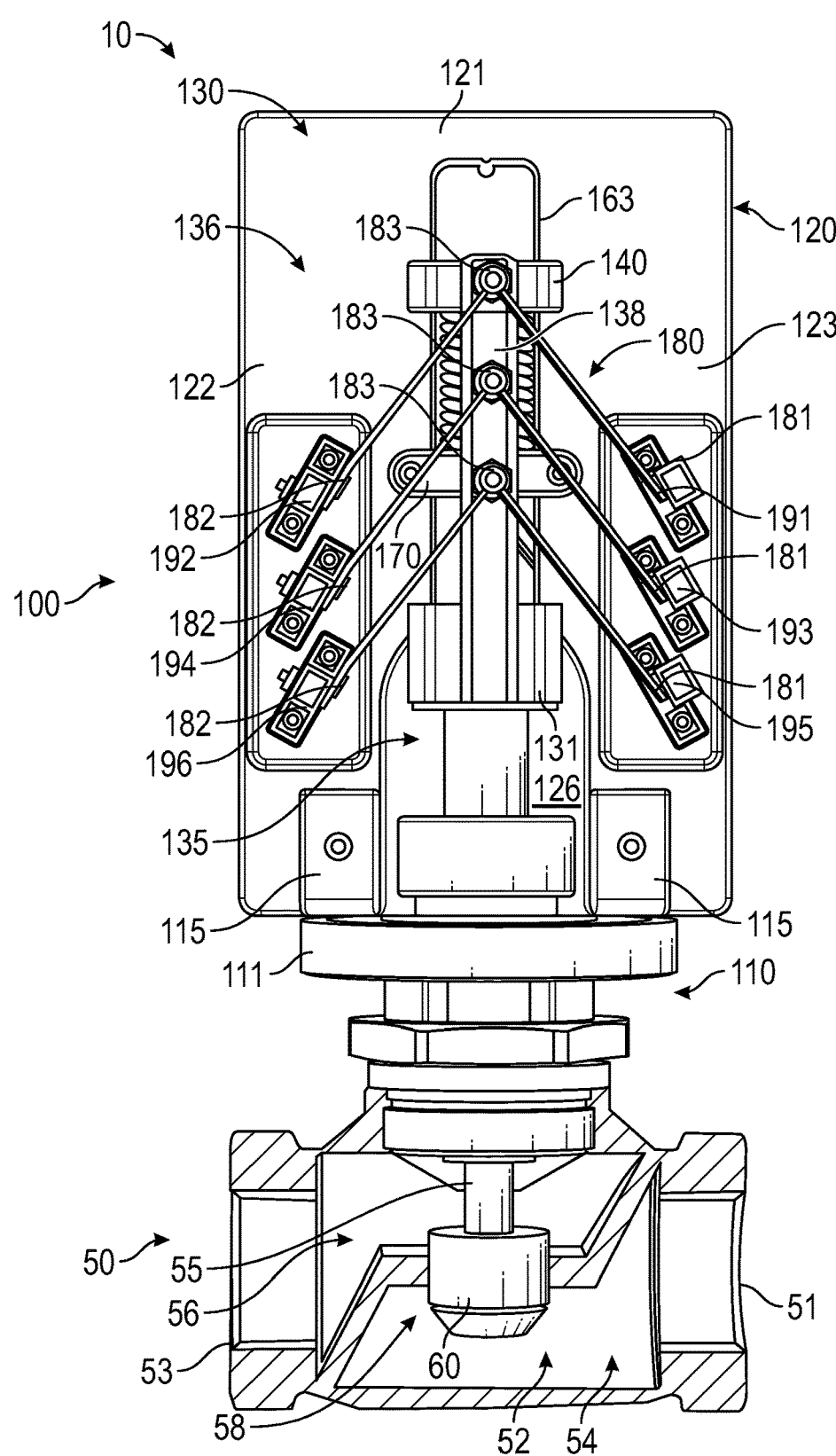
FIG. 2 is a front view of the actuator of FIG. 1, positioned in a different state of actuation, and a cross-sectional view of the valve of FIG. 1, according to one embodiment.
Figure 3:
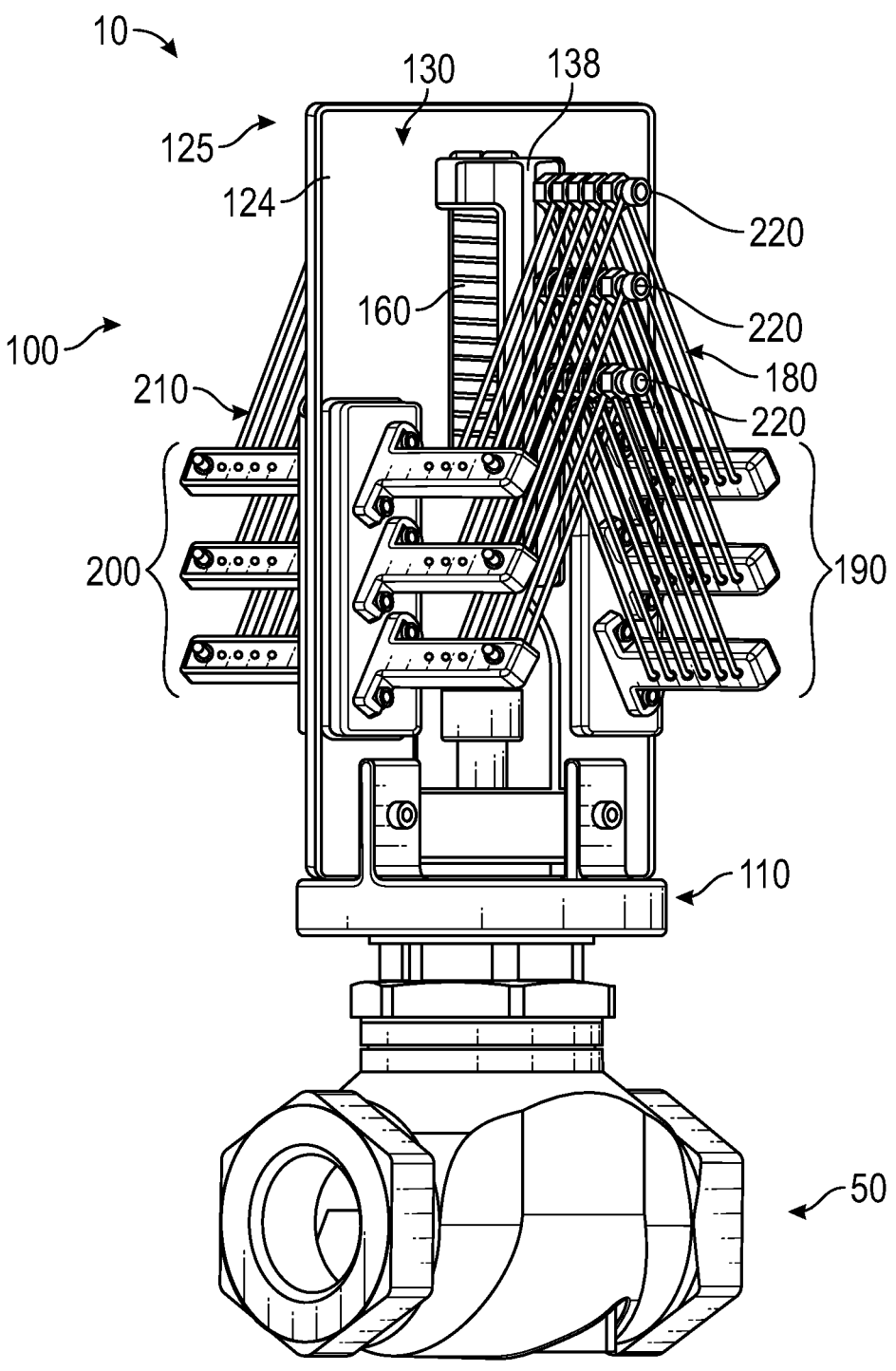
FIG. 3 is a perspective view of the actuator and valve of FIG. 1, according to one embodiment.

Turning now to FIGS. 1-3, a valve actuator assembly 10 is shown, according to some embodiments. FIGS. 1 and 2 depict front views of the valve actuator assembly 10, while FIG. 3 depicts the valve actuator assembly 10 in a perspective view. The valve actuator assembly 10 as depicted in FIGS. 1 and 3 is depicted in a de-actuated configuration relative to the valve actuator assembly as depicted in FIG. 2. For example, and as described in greater detail herein, in a de-actuated configuration, the valve actuator assembly 10 may allow (at least relative to the actuated configuration) fluid to flow through a valve (e.g., the valve is open, configured in a first state or first position, etc.), whereas in an actuated configuration, the valve actuator assembly 10 may prevent (at least relative to the de-actuated configuration) fluid from flowing through a valve (e.g., the valve is closed, configured in a second state or position, etc.).

Referring particularly to FIG. 1, the valve actuator assembly 10 may include an actuator 100 and a valve 50. The valve 50 may be controlled by the actuator 100 to control a flow of fluid through from an inlet 51 configured to receive the fluid, through a passageway (e.g., fluid channel, pipeline, conduit, etc.) 52, to an outlet 53 configured to expel the fluid. For example, the passageway 52 may include an inlet cavity 54 in fluid communication with the inlet 51 and a bottleneck 58. The passageway 52 may further include an outlet cavity 56 in fluid communication with the bottleneck 58 and the outlet 53. The valve 50 may include a plug 60 (e.g., a movable member, etc.) configured to extend into, or recede from, the bottleneck 58 in order to control the flow of fluid between the inlet cavity 54 and the outlet cavity 56, and thus through the passageway 52 of the valve 50. In some embodiments, the valve 50 includes a stem (e.g., a rod, elongate member, etc.) 55 coupled to the plug 60 and extending away from the valve 50, such that the stem 55 may interact with the actuator 100 for displacement of the plug 60. The plug may 60 rest on a seat 57 forming the bottleneck 58 of the passageway 52 within the valve 50 in order to restrict the fluid flow, whereas the fluid flow is allowed through the bottleneck 58 once the plug 60 is displaced from the seat 57. Although the present disclosure is described with reference to the valve 50 including the plug 60 and the stem 55, the valve actuator assembly 10 is not limited to actuation of the valve 50 as depicted, and can be suitably employed to operate any other type of valve, as per design and system requirement.

In some embodiments, the valve actuator assembly 10 includes a yoke 110. The yoke 110 may support the actuator 100 on the valve 50. For example, a body 111 of the yoke 110 may rest on a top surface of the valve 50. The yoke 110 may include a pair of arms 115 coupling the body 111 to the actuator 100. Thus, in various embodiments, the yoke 110 may be coupled to the valve 50 and the actuator 100. For example, suitable mountings may be provided on the valve 50 and the actuator 100 to facilitate coupling between the yoke 110, the valve 50 and/or the actuator 100. In some embodiments, the body 111 of the yoke 110 is fixedly coupled (e.g., welded, bolted, etc.) to the valve 50. In other embodiments, the yoke 110 is detachably coupled to the valve 50 using fasteners (e.g., a nut and bolt assembly, rivets, anchors etc.). In some embodiments, the body 111 of the yoke 110 is fixedly coupled to the actuator 100. In other embodiments, the arms 115 of the yoke 110 are detachably coupled to the actuator 100 using fasteners. In other embodiments still, the arms 115 are coupled to the actuator 100 using a snap-fit arrangement. Thus, in various arrangements, a coupling between the yoke 110 and the actuator 100 facilitates removal and/or replacement of the actuator 100 in cases of damage, failure of the actuator 100, and so on.

In some embodiments, the actuator 100 includes a frame 120. The frame 120 may be a panel, body, or member arranged for supporting one or more components of the valve actuator assembly 10 (and, in particular, the actuator 100) as provided herein. The frame 120 may be coupled (e.g., fixedly, detachably, etc.) to the arms 115 of the yoke 110. In some embodiments, the frame 120 forms in an inverted "U" shaped configuration (e.g., an "n" shaped configuration). For example, the frame 120 may define a shoulder 121 positioned above the yoke 110. The frame 120 may further define a first leg 122 and second leg 123 extending from the shoulder 121, downward toward the yoke 110. The first leg 122 and the second leg 123 may be spaced apart to form a slot 126. In other embodiments, the frame 120 is formed in other suitable configurations for supporting one or more components of the actuator 100. In some embodiments, the frame 120 includes a first surface 124 and an opposite second surface 125. Thus, the frame 120 defines a thickness extending between the first surface 124 and the second surface 125. In some embodiments, the first surface 124 and second surface 125 are substantially flat surfaces. In other embodiments, the first surface 124 and the second surface 125 form other suitable profiles and/or geometries apart from flat (e.g., curved, textured, etc.) suitable for supporting one or more components of the actuator 100.

In some embodiments, the actuator 100 includes an actuating arm 130 coupled to the stem 55 of the valve 50, positioned within the slot 126. The actuating arm 130 may be a spring-loaded arm, as described in greater detail below. The actuating arm 130 may include a distal end 132 and a proximal end 134. The distal end 132 may be positioned closer to the shoulder 121 relative to the proximal end 134, and the proximal end 134 may be positioned closer to the valve 50 relative to the distal end 132. The actuating arm 130 may include a first portion 135 and a second portion 136. The first portion 135 may extend upward from the proximal end 134, meeting the second portion 136 extending downward from the distal end 132. The first portion 135 may be coupled to the stem 55 of the valve 50. In some embodiments, the first portion 135 is fixedly or detachably coupled to the stem 55. In other embodiments, the first portion 135 form a bore configured to receive the stem 55 therein (e.g., threading, snap-fit, etc.). For example, the first portion 135 may be an annular member forming an axial bore extending from the proximal end 134 and upward along an axis defined by the first portion 135.

In some embodiments, the second portion 136 includes a base 131, a retainer 170, a front panel 138, a rear panel (not shown), a cap 140, and a spring (or springs) 160. The cap 140 (located at the distal end 132) and the base 131 may each be positioned within the slot 126 and slidably coupled to the first leg 122 and the second leg 123 via a track 163 formed by the frame 120. For example, the track 163 may be a smooth rounded edge of the frame 122 surrounding the slot 126. The cap 140 and the base 131 may each be displaced along the length of the slot 126 with the actuating arm 130. A distance between the base 131 and the cap 140 may be maintained by one or more structural components of the actuating arm 130. For example, the base 131 and the cap 140 may be coupled to opposite ends of an internal rod surrounded (at least in part) by the spring 160, thus maintaining a constant distance between the base 131 and the cap 140. The retainer 170 may be positioned within the slot 126 and fixedly coupled to the first leg 122 and the second leg 123. Thus, the actuating arm 130 may be "displaced" when the base 131 and the cap 140 are translated away from, or toward, the valve 50, according to the systems and methods described herein (e.g., actuation and de-actuation of the actuator 100, opening and closing the valve 50, etc.). Meanwhile, the retainer 170 may remain in one place. Accordingly, the spring 160 may be compressed between the retainer 170 and the cap 140. As described in greater detail below, the actuating arm 130 may actuate (e.g., close) the valve 50 when the actuating arm is displaced toward the valve 50 (thereby compressing the spring 160 between the retainer 170 and the cap 140), and the actuating arm 130 may de-actuate (e.g., open) the valve 50 when the actuating arm is displaced away from the valve 50 (due to a force provided by the compressed spring 160 to push the retainer 170 and the cap 140 apart, in some embodiments).

As suggested above, the actuating arm 130 may be a spring-loaded arm. For example, a cap end 161 of the spring 160 may be coupled to the cap 140, while a base end 162 of the spring 160 may be coupled to the retainer 170. In some embodiments, the spring 160 may surround at least a portion of the internal rod positioned between the base 131 and the cap 140. The spring 160 may operate within the valve actuator assembly 10 to facilitate the actuating arm de-actuating the valve 50 in various ways, depending on the implementation of the spring 160. While the spring 160 is generally described herein as serving to de-actuate the valve 50, it should be appreciated that that the systems and methods described herein facilitate alternative embodiments where the spring 160 serves to actuate the valve 50 (e.g., the spring 160 is positioned such that it biases the valve 50 into an open configuration, rather than a closed configuration).

In some embodiments, the spring 160 is be a compression (e.g., biased) spring. The spring 160 may be compressed, and therefore store energy (e.g., mechanical energy, elastic energy, kinetic energy, potential energy, etc.) when the actuating arm 130 is displaced toward the valve 50 (e.g., the cap 140 and the base 131 move toward the valve 50, such that the spring 160 is compressed due to a decreasing amount of space formed between the cap 140 and the stationary retainer 170). In other words, the spring 160 is compressed when the actuating arm 130 is moved into an actuated (or increasingly actuated) state in terms of operating the valve 50. The stored energy in the spring 160 may be utilized (e.g., converted to mechanical energy) to displace the actuating arm 130 away from the valve 50, (e.g., moving the actuating arm to a de-actuated or increasingly de-actuated state).

In other embodiments, the spring 160 is a tension spring. For example, the cap end 161 of the spring 160 may be coupled to a point of the frame 120 near the distal end 132 (e.g., within the slot 126), while the base end 162 of the spring 160 may be coupled to a component of the actuating arm 130 that moves during actuation or de-actuation (e.g., the cap 140, the base 131, etc.). When the actuating arm 130 is displaced towards the valve 50 (e.g., actuating the valve 50), the spring 160 may expand from its original state and store energy. The energy may facilitate the spring 160 returning to its original state, displacing the actuating arm 130 away from the valve 50 when the actuating force on the actuating arm 130 is removed.

In other embodiments still, the spring 160 some other type of spring, such as a spiral spring. Although the present disclosure is described with reference to a tension spring, a compression spring, or a spiral spring, the actuator 100 is not limited to aforementioned types of springs and any other type of spring or resilient member can be employed in the actuator with suitable arrangement. Moreover, while the present disclosure is generally described with reference to the spring 160 biasing the actuating arm 130 away from the valve 50, it should be appreciated that the spring 160 may be alternatively configured to bias the actuating arm 130 toward the valve 50, as suggested above.

In some embodiments, the spring 160 may be secured between the cap 140 and the retainer 170 by the front panel 138, the rear panel (mirroring the front panel 138 across a plane parallel to, and half-way in between, the first surface 124 and the second surface 125), and the interior rod. The spring 160 may surround the interior rod, which extends from the base 131 to the cap 140. The spring 160 may be positioned between the front panel 138 and the rear panel, which may each extend between, and be coupled to, the base 131 and the cap 140. Thus, the spring 160 may be compressed and decompressed linearly without any deviation or deflection (e.g., bending or buckling).

In some embodiments, the actuator 100 includes one or more activatable elements. The activatable elements can be or include any device, component, or material designed or configured to undergo a dimensional transformation (e.g., a change in dimension, shape, form, or otherwise) responsive to energy applied to the activatable elements. The activatable elements may be or include or be constructed of shape memory alloy (SMA), shape memory polymer, shape memory composite, shape memory hybrid, elastic memory composite, or any other component, element, or material (and combinations thereof) configured to undergo a dimensional transformation responsive to an energy input. While described herein as SMA elements 180, it is noted that any activatable element may be used in the actuator 100 described herein.

In some embodiments, a first number of SMA elements 180 obliquely coupled to the actuating arm 130 to displace the actuating arm 130 upon contraction (thereby compressing the spring 160 as suggested above). Each of the first number of SMA elements 180 may each include first ends 181, second ends 182, and mid-points 183. The midpoints 183 may be coupled to portion(s) of the actuating arm 130 that are closer to the shoulder 121 of the frame 120 than portion(s) of the frame 120 coupled to the first ends 181 and the second ends 182. For example, the first number of SMA elements 180 may be biased against (e.g., in contact with, arranged to press against, restrain, etc.) the actuating arm 130 in a pennant configuration as shown. As described in greater detail below, the first number of SMA elements 180 may, in the presence of an activating energy, contract in order to displace the actuating arm 130 closer to the valve 50, thus providing a actuating force that results in actuating (e.g., closing) the valve 50. Likewise, the first number of SMA elements 180 may expand when the presence of the actuating energy is removed, allowing the actuating arm 130 to be displaced away from the valve 50 due to the force of the spring 160 (as discussed above), thus de-actuating (e.g., opening) the valve 50. Depending on the implementation, the shape and dimensions of the first number of SMA elements 180 may be based on various design parameters such as an actuating force requirement of the valve (e.g., how much force is required to displace the plug 60), dimensions of the actuating arm 130, a number of first number of SMA elements 180 included in the valve actuator assembly 10, etc. The SMA elements may be made from any suitable material, including, but not limited to Nickel-Titanium (NiTi) alloy, and may be provided in any suitable form, including, but not limited to, wires, sheets, springs etc. The first number of SMA element 180 may be positioned in a space outward the first surface 124 (e.g., a space extending from the first surface 124 and away from the second surface 125). In some embodiments, the spring 160 is also made of SMA or made of a piezoelectric material. In this sense, the biasing force (e.g., compression, tension, etc.) of the spring 160 may be controlled or otherwise specified due to a material transformation caused by the presence of an actuating energy, which may be the same or different than the actuating energy provided to the SMA elements 180 as described herein.

In some embodiments, the first ends 181 and the second ends 182 of the first number of SMA elements 180 are attached to fixed supports. For example, the actuator 100 may include a first number of holders 190 extending from (e.g., orthogonally to a surface defined by) the first surface 124, and away from the second surface 125. The first number of holders 190 may be configured to secure the one or more first number of SMA elements 180. As shown, the holders 190 may be arranged in pairs on the first surface 124 (a first pair including a first holder 191 and a second holder 192; a second pair including a third holder 193 and a fourth holder 194; and a third pair including a fifth holder 195 and a sixth holder 196). While depicted in a three-pair configuration, it should be appreciated that any first number of holders 190 may be included in the actuator 100 in order to perform the systems and methods described herein. The holders 190 may be fixedly coupled to the first surface 124. Each individual holder of the holders 190 may be positioned opposite the actuating arm 130 from another individual holder of the holders 190 (e.g., the first holder 191 may be positioned on the second leg 123 opposite the second holder 192 on the first leg 122 relative to the horizontal position of the actuating arm 130). For example, the holders 190 may be arranged such that a line passing through the same pair of holders of the holders 190 (e.g., the first holder 191 and the second holder 192) is orthogonal to a vertical axis defined by the actuating arm 130. That is, a line passing through the first holder 191 and the second holder 192 (as well as each of the other corresponding pairs of the holders 190) is orthogonal to the vertical axis defined by the actuating arm 130. In other embodiments, the holders 190 are arranged such that a line passing through the pairs of the holders 190 is non-perpendicular to the actuating arm 130. In some embodiments, the distances between the adjacent holders 190 arranged on the same leg of the first leg 122 or the second leg 123 (e.g., a vertical distance between the first holder 191 and the third holder 193; and a vertical distance between the third holder 193 and the fifth holder 195) is uniform.

In some embodiments, the actuating arm 130 may include a number of pins (e.g., coupling members, rods, retaining arms, etc.) 220 coupled to the front panel 138. The front panel 138 may define a flat surface parallel to the first surface 124 and be positioned in the space outward the first surface 124, further away from the first surface 124 than the retainer 170, such that when the actuating arm 130 is displaced, the front panel 138 may be displaced without being obstructed by the retainer 170. The pins 220 may be coupled to and extend from the surface of the front panel 138. For example, the pins 220 may extend from the front panel 138 away from the first surface 124 and the second surface 125. In some embodiments, one or more of the pins 220 extend from the front panel 138 at an orthogonal to an outer surface defined by the front panel 138 (and, accordingly, the first surface 124).

Each of the pins 220 may be coupled to the mid-points 183 of the first number of SMA elements 180. For example, ends (e.g., the first end 181 and the second end 182) of a single SMA element may be attached to the two opposite holders (e.g., the first holder 191 and the second holder 192) of the same pair of holders, while the intermediate portion of the SMA element (e.g., the mid-point 183) is either directly or indirectly in contact with the actuating arm 130. The pins 220 may extend from the front panel 138 in order to provide a space for any number of layers of the first number of SMA elements 180 to be provided on the actuating arm 130 (e.g., a stack of SMA elements). For example, as shown in FIG. 3, the first number of SMA elements 180 are depicted as provided in five layers extending from the front panel 138. The first number of SMA elements 180 may not be in direct contact with each other and a spacing is maintained between adjacent SMA elements. More particularly, an end of an SMA element of the first number of SMA elements 180 may be connected to the first holder 191 of the pair of corresponding holders 191 and 192. The SMA element may then be coupled to one of the pins 220 either by making a contact with a portion of the pin or by making single or multiple turns around the pin. Further, the SMA element is secured to a second holder 192 to form a first line of the stack of SMA elements. The SMA element may then be turned back from the second holder 192 and contacted again with the pin and then with the first holder 191 forming a second line of the stack. The aforesaid steps can be repeated until a whole length of the SMA element is utilized. Similar stacks can be formed for the corresponding pairs of holders 193 and 194, as well as 195 and 196.

However, it should be appreciated that less or more layers of the first number of SMA elements 180 may be included in the actuating arm 130 (e.g., 1, 2, 3, 4, 6, 7, or more). Accordingly, in some embodiments, a single SMA element of the first number of SMA elements 180 is connected between the actuating arm 130 and each of a corresponding pair of holders of the holders 190. While described above as one SMA element forming the first end 181, the second end 182, and the mid-point 183, in some other embodiments, more than one SMA elements are connected between the actuating arm 130 and each holder (e.g., a corresponding pair of the holders 190). For example, ends of multiple SMA elements of the first number of SMA elements 180 may be attached to a corresponding pair of the holders 190, while the intermediate portions of the SMA elements are in contact with the actuating arm.

In some embodiments, the pins 220 include receivers configured to accept and secure the mid-points 183 of the first number of SMA elements 180 (e.g., holes, hooks etc.). In some embodiments, one or more of the pins 220 are rigid rods having smaller cross section at their bodies (e.g., first portions of the pins 220 closer to the front panel 138) and larger cross sections at their heads (e.g., second portions of the pins 220 further from the front panel 138 than the first portions). In some embodiments, the pins 220 are threaded members. For example, the first portions of the pins 220 may feature threading. In turn, the front panel 138 may feature corresponding threaded bores configured to receive the first portions of the pins 220 that feature threading. In some embodiments, the second portions of the pins 220 may be include a cap configured to retain the SMA elements 180 (e.g., prevent the SMA elements from displacement away from the first surface 124, thus losing contact with the pins 220). For example, the second portions of the pins 220 may feature threading configured to accept a lock (e.g., a threaded nut) to prevent slipping of the first number of SMA elements 180 from the pins 220. In other embodiments still, the pins 220 may be formed as a screw or bolt, thus forming a single body that includes a cap and threading for insertion into threaded bores featured on the front panel 138.

All the aforementioned arrangements of the SMA elements 180 and the holders 190 can be employed for the SMA elements 210 and the holders 200 arranged on the opposite second surface 125 of the frame 120. It is to be noted that the aforementioned arrangements of the SMA elements and the holders are for illustration only. The actuator of the present disclosure is not limited to the aforementioned arrangement and any other suitable arrangement of the SMA elements and the holders is well within the scope and ambit of the present disclosure.

In some embodiments, the holders 190, 200 and the pins 220 are provided with electrical insulation. In some embodiments, cores of the holders 190, 200 and the pins 220 are made of metals and are covered with electrically insulating materials, such as plastics. In some embodiments, cores of the holders 190, 200 and the pins 220 are coated with electrically insulating materials.

In some embodiments, the actuator 100 includes a second number of SMA elements 210, which may be positioned in a space outward the second surface 125 (e.g., a space extending from the second surface 125 and away from the first surface 124). The second number of SMA elements 210 may be secured by a second number of holders 200 extending from (e.g., orthogonally to a plane defined by) the second surface 125, away from the first surface 124. Depending on the implementation, the second number of holders 200 may be arranged similarly to the first number of holders 190 (e.g., mirroring the first number of holders 190 across a plane parallel to, and half-way in between, the first surface 124 and the second surface 125). In some embodiments, a mirror-image relationship between the arrangement of the first number of SMA elements and first number of holders 190, and the second number of SMA elements 210 and the second number of holders 210, balances the actuating force exerted on the actuating arm 130, such that the actuating arm 130 may be axially displaced without tilting.

In some embodiments, the first number of holders 190 and/or the second number of holders 200 are coupled to the first surface 124 and/or the second surface 125 (respectively) via a number of reinforcements 128. For example, the first number of holders 190 and/or the second number of holders 200 may be coupled to the reinforcements 128, which may be coupled to the first surface 124 and/or the second surface 125. The first number of holders 190 may be welded to the reinforcements 128, attached with fasteners, or some other suitable manner. The reinforcements 128 may be similarly coupled to the first surface 124 and/or the second surface 125.

Figure 4:
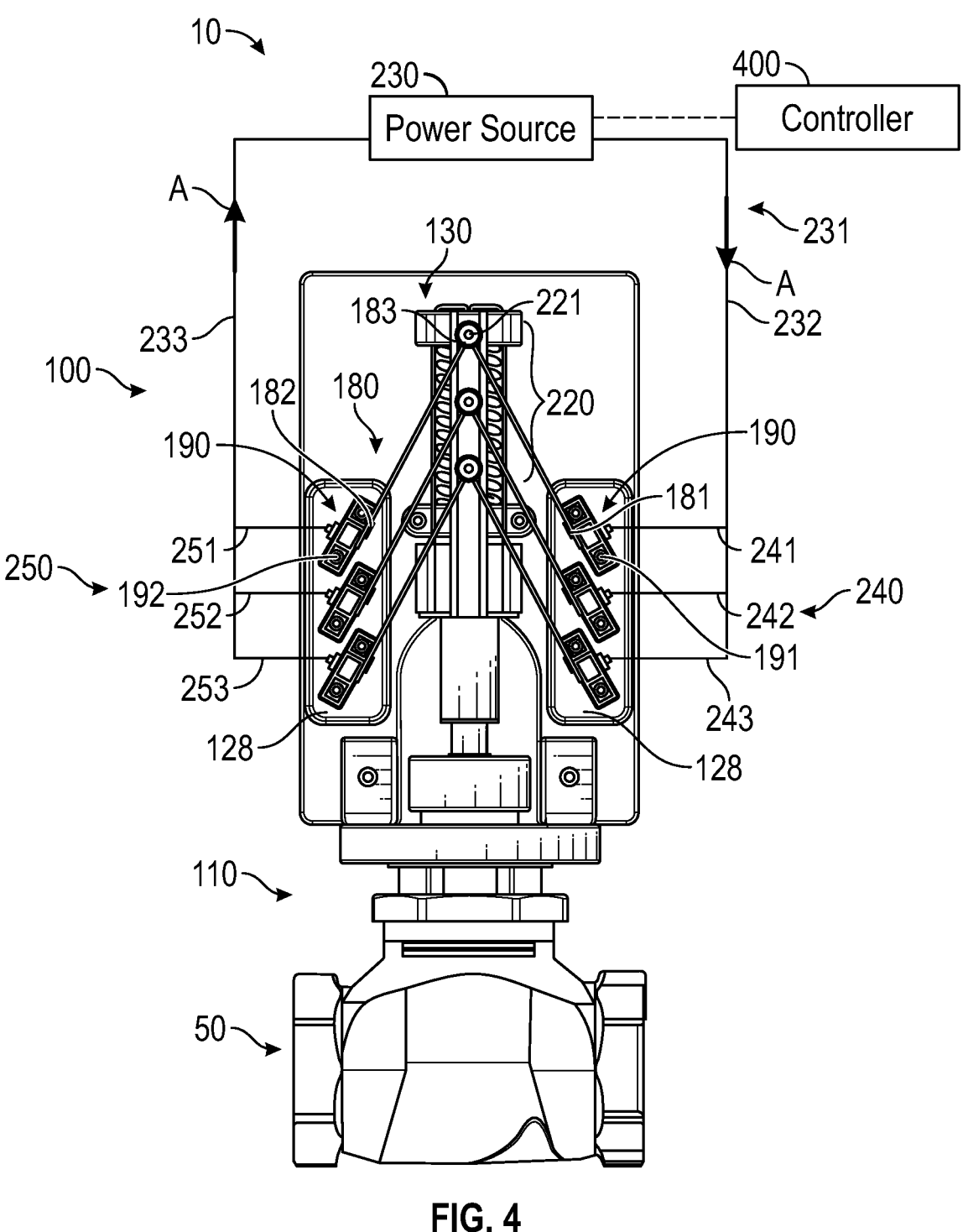
FIG. 4 is a front view of the actuator and valve of FIG. 1 with a power source, according to one embodiment.

Referring now to FIG. 4, the valve actuator assembly 10 is shown to include a power source 230 and controller 400 interacting with the actuator 100, according to some embodiments. In some embodiments, the valve actuator assembly 10 includes one or more power sources 230 for heating (e.g., providing an activating energy to) the first number of SMA elements 180 and/or the second number of SMA elements 210 in order to facilitating contraction of the first number of SMA elements 180 and/or the second number of SMA elements 210. For example, when the first number of SMA elements 180 are activated by joule heating, as provided by the power source 230, the first number of SMA elements 180 undergo a material transformation resulting in the contraction that displaces the actuating arm 130 and thus facilitates the actuation of the valve 50 as described herein.

In some embodiments, the power source 230 may be in communication with a source end 232 on a positive terminal of the power source 230 and a discharge end 233 on a negative terminal. The source end 232 and discharge end 233 may be in electrical communication to form a circuit 231. Thus, the energy from the power source 230 may travel on the source segment 232 of the circuit 231 in a direction "A", which may provide the energy source to a first junction 240 of the circuit 231. At the first junction 240, the circuit 231 may branch into a first number of segments (e.g., a first segment 241, a second segment 242, and a third segment 243) connected to the circuit 231 in parallel. The first number of segments may be in electrical communication with a second number of segments (e.g., a fourth segment 251, a fifth segment 252, and a sixth segment 253 configured in parallel) that are rejoined at a second junction 250 of the circuit 231, which may allow the energy source to complete the circuit 231 via the discharge end 233 of the circuit 231. Each of the segments identified above may involve a single SMA element of the first number of SMA elements 180, a pair of the first number of holders 190 (e.g., the first holder 191 and the second holder 192), and one of the pins 220. For example, the first segment 241 may extend from the first junction 240 (e.g., in parallel with the second segment 242 and the third segment 243) and be in electrical communication with the first end 181 of an SMA element of the first number of SMA elements 180 positioned at the first holder 191. The energy may be allowed to travel along the SMA element to the mid-point 183 of the SMA element (e.g., around the pin 221 of the pins 220), and to the second end 182 of the SMA element positioned at the second holder 192. The second end 182 of the SMA element may be in electrical communication with the fourth segment 251, which may join the fifth segment 252 and the sixth segment 253 at the second junction 250. The second junction 250, in turn, may be in electrical communication with the discharge end 233, and thus the negative terminal of the power supply 230.

Accordingly, the power source 230, as operated by the controller 400, may be configured to provide a selective amount of joule heating to the first number of SMA elements 180. In some embodiments, the valve actuator assembly 10 includes a single power source 230 in order to heat all the first number of SMA elements 180 and the second number of SMA elements 210. In other embodiments, two or more heating sources, such as the power source 230, may be included in the valve actuator assembly 10 in order to heat various partitions of the first number of SMA elements 180 and/or the second number of SMA elements 210. As an example, two power sources 230 may be included in the valve actuator assembly 10 in order to separately provide joule heating to the first number of SMA elements 180 and the second number of SMA elements 210. As another example, each of the first number of SMA elements 180 and the second number of SMA elements 210 may be provided with joule heating by a set of two or more power sources (e.g., two or more power sources associated with each of the first number of SMA elements 180 and the second number of SMA elements 210). As yet another example, multiple power sources may be configured to provide joule heating to partitions of the SMA elements that between the first number of SMA elements 180 and the second number of SMA elements 210 (e.g., a first power source configured to provide joule heating to the SMA elements of the first number of SMA elements 180 coupled to a particular pair of the holders 190 and a and the SMA elements of the second number of SMA elements 210 coupled to another particular pair of the holders 200). The amount of the heat to be supplied by the power source(s) 230 may be determined based on various parameters such as required magnitude of actuating force, rate of contraction of the SMA elements, heat transfer rate SMA elements, conductivity, and dimension of the SMA elements, etc.

In operation, the valve actuator assembly 10 may be provided with the valve 50 in a first state of actuation, according to a first position of the plug 60 as dictated by the actuating arm 130. To actuate the valve 50, the actuating arm 130 may be required to be displaced towards the valve 50 (thus moving the plug 60 into the bottleneck 58, thereby obstructing the fluid flow through the passageway 52 within the valve 50). In order to displace the actuating arm such that the actuating arm 130 moves toward the valve 50, the first number of SMA elements 180 and/or the second number of SMA elements 210 may be heated (via the power source 230 providing joule heating), resulting in contraction along their length. Contraction of the SMA elements may provide a force against the pins 220 due to the oblique angle formed by the first ends 181 and the second ends 182 relative to the midpoints 183 in contact with the pins 220. This force may cause the actuating arm 130 to be displaced toward the valve 50. When the actuating arm 130 is displaced towards the valve 50, the stem 55 may be displaced towards the valve 50, thereby displacing the plug 60 within the valve 50 into the bottleneck 58 to close the valve 50. It should be appreciated that, depending on the implementation of the valve 50, displacing the actuating arm 130 toward the valve 50 may alternatively operate to open the valve 50 (e.g., where displacing the plug 60 downward removes the plug 60 from the bottleneck 58, rather than into the bottleneck 58 as generally described herein). When the valve 50 is actuated, due to drawing the actuating arm 130 toward the valve 50, the spring 160 is compressed. The spring 160 may be pre-compressed to provide tension to the initial configuration of the first number of SMA elements 180 and/or the second number of SMA elements 210. The dimensions of the first number of SMA elements 180 and/or the second number of SMA elements 210 are determined such that the force exerted on the actuating arm 130 due to the contraction of the first number of SMA elements 180 and/or the second number of SMA elements 210 may displace the actuating arm 130, as well as can compress the spring 160.

To open the valve 50, the generation of heat in the first number of SMA elements 180 and/or the second number of SMA elements 210 is prevented. Subsequently, the SMA elements 180, 210 start cooling. In some embodiments, a dedicated cooling unit is employed to facilitate fast cooling of the SMA elements 180, 210. As the temperature of the SMA elements 180, 210 reduces, the SMA elements 180, 210 expands along the length from the contracted state and returns to their initial position. Due to this, the pulling or actuating force on the actuating arm 130 reduces gradually. Once the pulling force starts to reduce gradually, the spring 160 begins to expand and displace the actuating arm 130 in the direction opposite to the valve 50, thereby opening the valve 50.

The actuator of the present disclosure is more accurate and precise as compared to conventional electromagnetic or pneumatic actuators. The actuator is compact is size as compared to conventional actuators. Further, the actuator has enhanced durability due to oblique arrangement of the SMA elements. The actuator is cost effective and easy to maintain due to lesser number of moving parts as compared to conventional actuators. Due to the SMA elements, the actuator operates without making any noise as the actuator includes a smaller number of frictional components.

Figure 5:
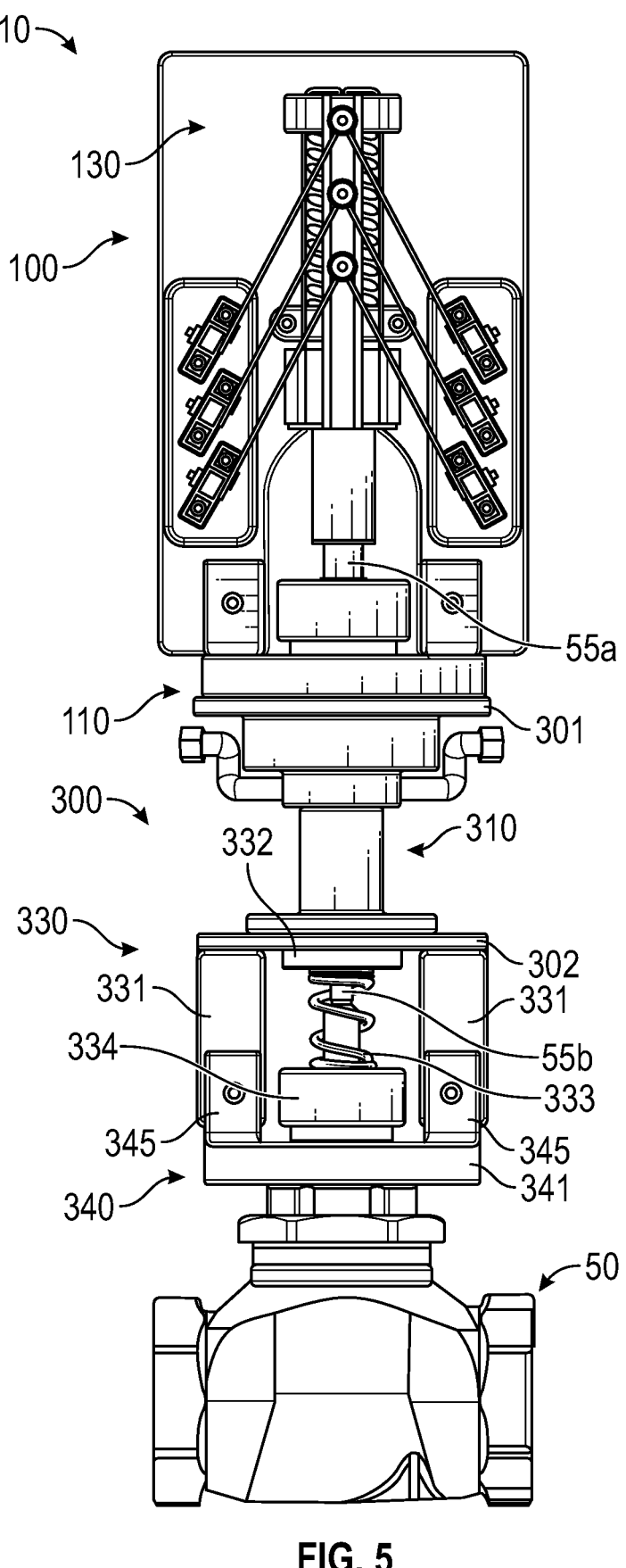
FIG. 5 is a front view of an actuator and valve, according to another embodiment.
Figure 6:
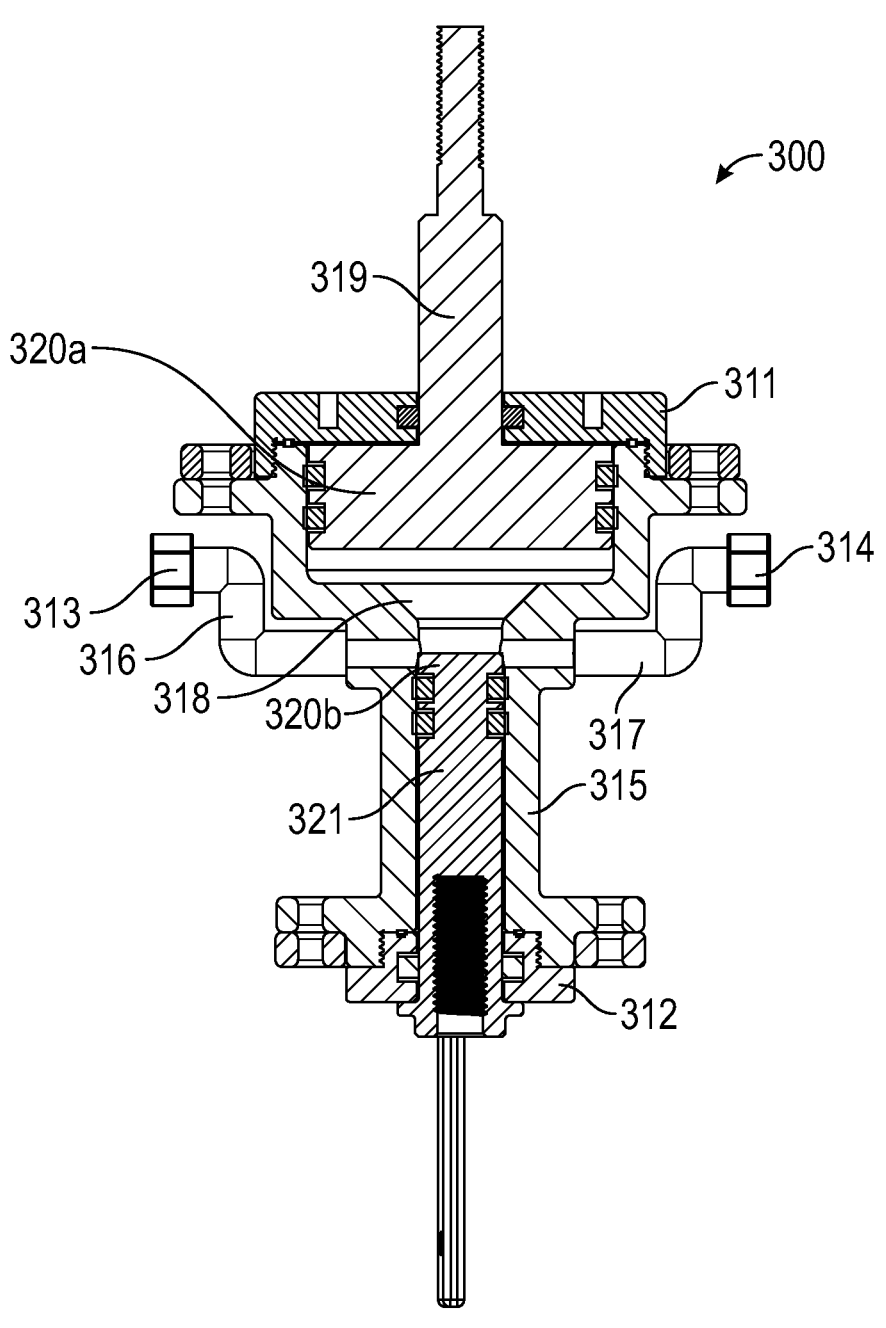
FIG. 6 is a cross-sectional view of a stroke amplifier for the actuator of FIG. 5, according to one embodiment.

Referring now to FIGS. 5 and 6, the valve actuator assembly 10 is shown with a stroke amplifier 300, according to some embodiments. As illustrated in FIG. 5, and in some embodiments, the stroke amplifier 300 is a hydraulic mechanism that includes an upper coupling member 301, a hydraulic body 310, an actuator 330, a yoke 340, and a lower coupling member 302. As shown in this exemplary embodiment, the yoke 110 may support the actuator 100 on the stroke amplifier 300 (as opposed to supporting the actuator 100 on the valve 50, shown above with reference to FIGS. 1-4). The body 111 of the yoke 110 may be coupled to the hydraulic body 310 by the upper coupling member 301. The hydraulic body 310 may be coupled to the actuator 330 by the lower coupling member 302. The yoke 340 may then support the stroke amplifier 300 on the valve 50. For example, the yoke 340 may include arms 345 coupled to a frame 331 of the actuator 330. The frame 331 may be coupled to the hydraulic body 310 by the lower coupling member 302. The yoke 340 may further include and a body 341 coupled to the arms 345 and the valve 50, thus allowing the yoke 340 to support the stroke amplifier 300 on the valve 50.

The hydraulic body 310 of the stroke amplifier 300 may include a housing that forms an upper flange 311, a lower flange 312, an inlet arm 313, an outlet am 314, and a neck 315. The inlet arm 313 and outlet arm 314 may house an inlet passageway 316 and an outlet passageway 317 (respectively), which may each be in fluid communication with a cylinder tube 318 housed by the upper flange 311, neck 315, and lower flange 312. The cylinder tube 318 may surround a one or more pistons 320 (or cylinders) including an upper piston 320a and lower piston 320b. The upper piston 320a may be coupled to a first piston rod 319, and the lower piston 320b may be coupled to a second piston rod 321. As shown, the stem 55 (introduced above with reference to FIGS. 1-4) may be separated into an upper stem portion 55a and a lower stem portion 55b, in this exemplary embodiment. The first piston rod 319 may be coupled to the upper stem portion 55a and the second piston rod 321 may be coupled to the lower stem portion 55b. Thus, when the actuating arm 130 is displaced toward the valve 50 as suggested above, the upper stem portion 55a is displaced toward the valve 50, such that the first piston rod 319 (and correspondingly the upper piston 320a) move towards the valve 50, which pushes hydraulic fluid against the lower piston 320b (and correspondingly the second piston rod 321), thereby pushing, displacing, or otherwise controlling the plug 60, relative to the bottleneck 58 within the valve 50, to control the flow of fluid between through the valve 50 as suggested above.

In some embodiments, the pistons 320 and the first and second piston rods 319, 321 are reciprocally disposed within the cylinder tube 318, as can be best seen in FIG. 6. The stroke amplifier 300 may be of the equal displacement through-rod variety. The cylinder tube 318 may be housed with its opposite ends closed, with the first piston rod 319 passing through seal means 116 coupled to the yoke 110 (thus allowing a coupling between the first piston rod 319 and the upper stem portion 55a) and the second piston rod 321 passing through seal means 332 of the actuator 330 (thus allowing a coupling between the second piston rod 321 and the lower stem portion 55b). In the embodiment shown, the upper piston 320a may have a diameter which is greater than a diameter of the lower piston 320b. By having a difference in diameter, displacement of the upper piston 320a may in turn result in a greater (e.g., in proportion to a difference in size or diameter) displacement of the lower piston 320b, thereby providing an unequal displacement hydraulic cylinder within the hydraulic body of the stroke amplifier 300 and amplifying a stroke of the actuating arm 130. In some embodiments, the inlet passageway 316 provides for the flow of fluid to and from one port of a hydraulic pump (not shown), and the outlet passageway 317 provides for the flow of fluid to and from another port of the pump. Accordingly, and in some embodiments, hydraulic fluid under pump pressure may be supplied to the cylinder tube 318 to amplify the stroke of the actuating arm 130, upper stem portion stem 55a, and lower stem portion 55b. The lower stem portion 55b may be guided to the plug 60 via a sleeve 334 coupled to the yoke 340. In some embodiments, a spring 333 may be positioned between the seal means 332 (which may be configured to be displaced along with the lower stem portion 55b) and the sleeve 334. Thus, the spring 333 may provide a damping force biasing against the amplified stroke as provided by the stroke amplifier 300. In some embodiments, the spring 333 is made in a similar manner as the spring 160. Accordingly, in various embodiments, the spring 333 is made of SMA or made of a piezoelectric material. In this sense, the damping force of the spring 333 may be controlled or otherwise specified due to a material transformation caused by the presence of an actuating energy, which may be the same or different than the actuating energy provided to the SMA elements 180 as described herein.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the actuator 100 that includes a first number of SMA elements 180 of the embodiment depicted in at least FIG. 2 may be incorporated in the valve actuator assembly 10 that includes an additional second number of SMA elements 210 depicted in at least FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A valve actuator assembly, comprising:
an actuating arm configured to be movable relative to a frame and a valve;
a biasing member coupled to the actuating arm and the frame, the biasing member configured to bias the actuating arm in a first direction relative to the frame;
a holder extending from a surface of the frame;
multiple activatable elements aligned in parallel with each other and coupled to the actuating arm and the holder, wherein the multiple activatable elements, responsive to an activation by an electric current applied to the multiple activatable elements, undergo a dimensional transformation and collectively apply a force to bias the actuating arm in a second direction opposite the first direction relative to the frame; and
a movable component coupled to the actuating arm and positioned at least partially within the valve, wherein the movable component is configured to control a variable amount of fluid flow through the valve based on a position of the actuating arm.

2. The valve actuator assembly of claim 1, wherein the multiple activatable elements are arranged in a pennant formation, such that each of the multiple activatable elements comprises a pair of ends coupled to the holder, and a mid-point that is coupled to the actuating arm at a location that is farther from the valve than the pair of ends.

3. The valve actuator assembly of claim 1, further comprising a stroke amplifier coupled to the frame and the movable component, such that the stroke amplifier converts a first stroke length of the actuating arm to a second stroke length greater than the first stroke length.

4. The valve actuator assembly of claim 1, wherein the biasing member comprises a shape memory alloy.

5. An assembly, comprising:
a frame configured to couple to a valve;
a holder extending from a surface of the frame;
an actuating arm movably coupled to the frame and configured to move a movable component of the valve to adjust a position of the movable component;
a biasing member coupled to the actuating arm and the frame, the biasing member configured to bias the actuating arm in a first direction relative to the frame; and
multiple shape memory alloy (SMA) elements coupled to the actuating arm and the holder, the multiple SMA elements aligned in parallel with each other, wherein responsive to an activation by an electric current applied to the multiple SMA elements that causes the multiple SMA elements to undergo a dimensional transformation, the multiple SMA elements are configured to collectively apply a force to operate against the biasing member to bias the actuating arm in a second direction opposite the first direction relative to the frame.

6. The assembly of claim 5, wherein the multiple SMA elements are angularly offset relative to a longitudinal axis of the actuating arm.

7. The assembly of claim 6, wherein a first portion of the multiple SMA elements are angularly offset to a first side of the actuating arm and a second portion of the multiple SMA elements are offset to a second side opposite the first side of the actuating arm.

8. The assembly of claim 6, wherein a first portion of the multiple SMA elements are coupled to the actuating arm at a first position on the actuating arm and a second portion of the multiple SMA elements are coupled to the actuating arm at a second position longitudinally spaced from the first position along the longitudinal axis of the actuating arm.

9. The assembly of claim 5, further comprising a stroke amplifier coupled to the actuating arm and the movable component, the stroke amplifier configured to convert a first stroke length of the actuating arm to a second stroke length greater than the first stroke length and provide the second stroke length to the movable component.

10. The assembly of claim 9, wherein the stroke amplifier comprises a hydraulic stroke amplifier.

11. The assembly of claim 5, wherein the multiple SMA elements are arranged in a pennant formation, such that each of the multiple SMA elements comprises a pair of ends coupled to the holder, and a mid-point that is coupled to the actuating arm such that the multiple SMA elements extend at an angle relative to a longitudinal axis of the actuating arm between the mid-point and the pair of ends.

12. The assembly of claim 5, wherein the multiple SMA elements are configured to change length based on a change in the electric current.

13. A method of controlling a valve, the method comprising:
providing an actuating arm movably coupled to a frame for the valve and configured to move a movable component of the valve to adjust a position of the movable component;
providing a biasing member coupled to the actuating arm and the frame, the biasing member configured to bias the actuating arm in a first direction relative to the frame;
providing a holder extending from a surface of the frame;
selectively activating multiple shape memory alloy (SMA) elements coupled to the actuating arm and the holder, the multiple SMA elements aligned in parallel with each other, wherein responsive to the activation, the multiple SMA elements undergo a dimensional transformation, such that the multiple SMA elements collectively apply a force to operate against the biasing member to bias the actuating arm in a second direction opposite the first direction relative to the frame; and
converting a first stroke length of the actuating arm to a second stroke length greater than the first stroke length and providing the second stroke length to the movable component.

14. The method of claim 13, wherein the multiple SMA elements are angularly offset relative to a longitudinal axis of the actuating arm.

15. The method of claim 14, wherein a first portion of the multiple SMA elements are angularly offset to a first side of the actuating arm and a second portion of the multiple SMA elements are offset to a second side opposite the first side of the actuating arm.

16. The method of claim 14, wherein a first portion of the multiple SMA elements are coupled to the actuating arm at a first position on the actuating arm and a second portion of the multiple SMA elements are coupled to the actuating arm at a second position longitudinally spaced from the first position along the longitudinal axis of the actuating arm.

17. The method of claim 13, wherein converting the first stroke length to the second stroke length comprises using a hydraulic stroke amplifier.

18. The method of claim 13, wherein the multiple SMA elements are arranged in a pennant formation, such that each of the multiple SMA elements comprises a pair of ends coupled to the holder, and a mid-point that is coupled to the actuating arm such that the multiple SMA elements extend at an angle relative to a longitudinal axis of the actuating arm between the mid-point and the pair of ends.

19. The method of claim 13, wherein the multiple SMA elements are configured to change length based on a change in an applied electric current.

* * * * *